(12) United States Patent  
Govender

(10) Patent No.: US 9,701,522 B2
(45) Date of Patent: Jul. 11, 2017

(54) WORK VEHICLE

(71) Applicant: Krishna Govender, Greytown (ZA)

(72) Inventor: Krishna Govender, Greytown (ZA)

( * ) Notice: Subject to any disclaimer, the term of this patent is extended or adjusted under 35 U.S.C. 154(b) by 53 days.

(21) Appl. No.: 14/435,120

(22) PCT Filed: Oct. 11, 2013

(86) PCT No.: PCT/IB2013/059306
§ 371 (c)(1),
(2) Date: Apr. 10, 2015

(87) PCT Pub. No.: WO2014/057467
PCT Pub. Date: Apr. 17, 2014

(65) Prior Publication Data
US 2015/0274492 A1    Oct. 1, 2015

(30) Foreign Application Priority Data
Oct. 11, 2012  (ZA) .................................. 2012/07653

(51) Int. Cl.
| | | |
|---|---|---|
| *B60K 17/356* | (2006.01) | |
| *B66C 23/46* | (2006.01) | |
| *B62D 7/02* | (2006.01) | |

(52) U.S. Cl.
CPC ............ *B66C 23/46* (2013.01); *B60K 17/356* (2013.01); *B62D 7/026* (2013.01)

(58) Field of Classification Search
CPC ...... B66C 23/46; B60K 17/358; B62D 7/026; B62D 7/023; B62D 7/02

USPC .......................................................... 180/418
See application file for complete search history.

(56) References Cited

U.S. PATENT DOCUMENTS

| | | | | | |
|---|---|---|---|---|---|
| 1,028,866 | A | * | 6/1912 | Eadie ..................... | B62D 13/04 |
| | | | | | 280/100 |
| 1,242,223 | A | * | 10/1917 | Mueller ................. | B62D 13/02 |
| | | | | | 280/102 |
| 2,748,509 | A | * | 6/1956 | Brown .................... | B62D 7/14 |
| | | | | | 104/2 |
| 3,075,784 | A | * | 1/1963 | Beyerstedt ........... | B62D 7/1509 |
| | | | | | 116/31 |
| 3,149,858 | A | * | 9/1964 | Gilbert ................. | B62D 13/025 |
| | | | | | 280/100 |
| 3,331,464 | A | * | 7/1967 | Van Doorne .......... | B60K 17/34 |
| | | | | | 180/19.2 |

(Continued)

*Primary Examiner* — Anne Marie Boehler
*Assistant Examiner* — Michael Stabley
(74) *Attorney, Agent, or Firm* — Knobbe Martens Olson & Bear LLP

(57) ABSTRACT

The invention relates to a work vehicle (10), particularly, for use in rugged uneven terrain, for example, in agriculture/forestry. The vehicle (10) generally has a chassis frame (24) and a pair of axles (14, 20) longitudinally spaced along the chassis (24), the axles (14, 20) being pivotable in an opposing or opposite fashion about axes (A, D) generally perpendicular to the longitudinal axis of the chassis. The vehicle (10) has a support frame (206) mounted relative to a front axle (14) to be displaceable therewith, in use. The vehicle (10) also has a work apparatus (204) mountable to the support frame (206) and displaceable relative to the vehicle (10) wherein, in use, under control of an operator, the support frame (206) and work apparatus (204) are adapted to rotate with the first axle (14) about the first pivot axis (A).

19 Claims, 12 Drawing Sheets

(56) References Cited

U.S. PATENT DOCUMENTS

| | | | | |
|---|---|---|---|---|
| 3,529,848 A * | 9/1970 | Harvey | ............ | B62D 13/04 |
| | | | | 280/445 |
| 3,596,730 A * | 8/1971 | Cecce | ............ | B62D 7/1536 |
| | | | | 180/236 |
| 3,806,160 A * | 4/1974 | Duerksen | ............ | B62D 13/06 |
| | | | | 140/140 |
| 4,715,466 A * | 12/1987 | Ishii | ............ | B60K 17/358 |
| | | | | 180/233 |
| 4,738,459 A * | 4/1988 | Nakamura | ............ | B62D 7/142 |
| | | | | 180/409 |
| 4,798,393 A * | 1/1989 | Miura | ............ | B62D 7/1509 |
| | | | | 180/409 |
| 6,684,974 B1 * | 2/2004 | Ulschmid | ............ | B62D 7/1527 |
| | | | | 180/414 |
| 7,571,916 B2 * | 8/2009 | Skiles | ............ | B62D 13/02 |
| | | | | 180/24.01 |
| 7,926,833 B2 * | 4/2011 | Hellbusch | ............ | B62D 13/02 |
| | | | | 180/24.01 |
| 2009/0038186 A1 * | 2/2009 | Osswald | ............ | B62D 21/14 |
| | | | | 37/413 |

\* cited by examiner

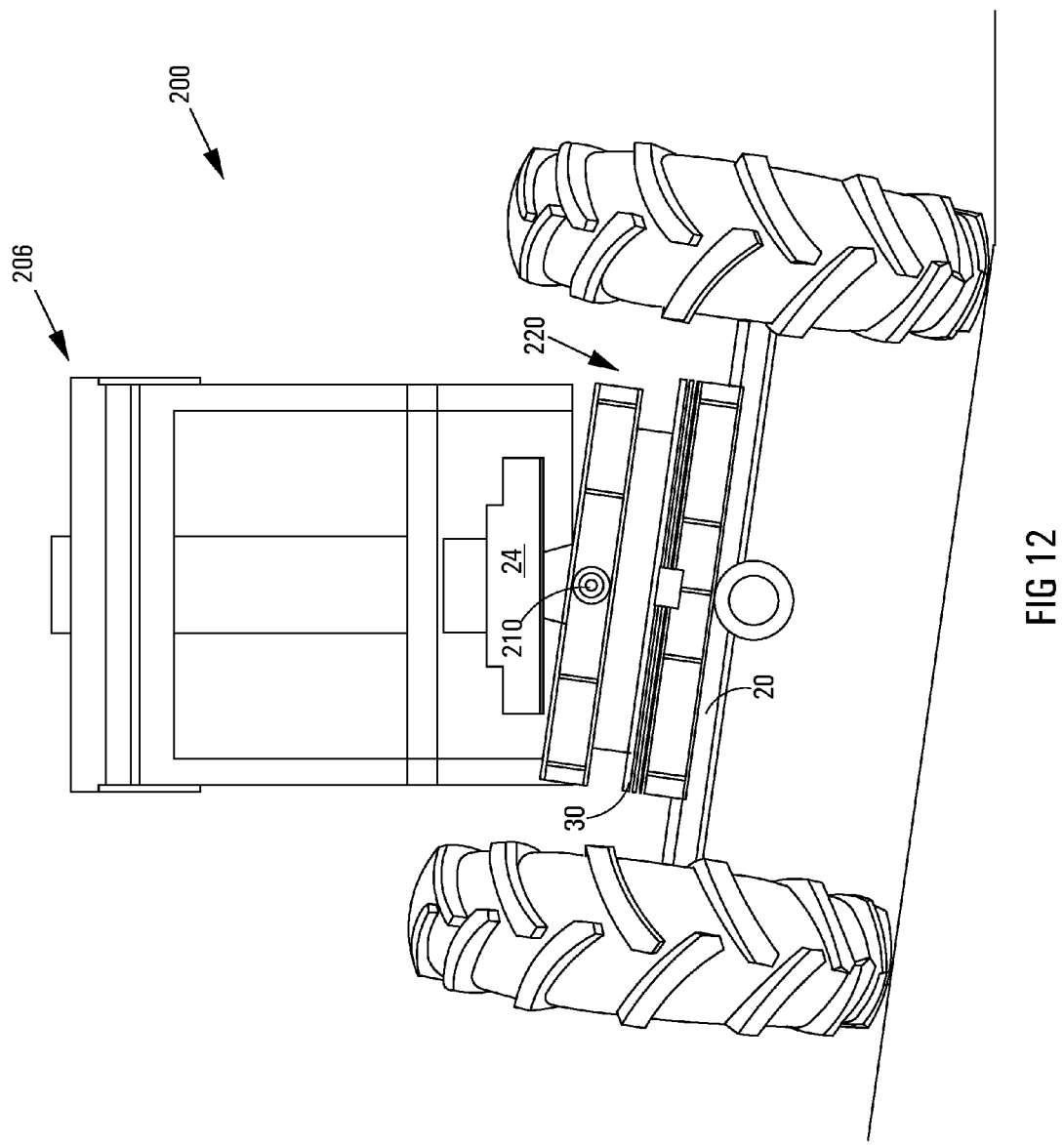

WORK VEHICLE

CROSS REFERENCE TO RELATED APPLICATIONS

This application claims the benefit and priority to and is a U.S. National Phase Application of PCT International Application Number PCT/IB2013/059306, filed on Oct. 11, 2013, designating the United States of America and published in the English language, which claims priority to South African application number 2012/07653, filed Oct. 11, 2012. The disclosures of the above-referenced applications are hereby expressly incorporated by reference in their entireties.

BACKGROUND OF THE INVENTION

THIS INVENTION relates to a work vehicle, particularly a four wheel drive work vehicle for use on rugged off-road terrain.

Work vehicles, for example, agricultural vehicles such as loaders, tractors, or the like each typically have a base comprising a chassis connectable to wheels which may be driven, for example, by way of a power plant or drive means comprising an internal combustion engine, or the like. The driven wheels thereof causes agricultural vehicles to traverse over surfaces, for example, rugged off-road terrain associated with plantations, farms, field, or the like in a conventional fashion for use in a conventional manner.

Vehicles comprising conventional vehicle drive arrangements find difficulty in negotiating inclined surfaces, for example, rocky surfaces or obstacles. In this regard, it will be appreciated that at least one wheel of the drive arrangement may be configured to be steerable by way of a steering arrangement associated therewith, for example, to steer the vehicles around the obstacles. However, a problem exists in that, for example, conventional steering arrangements are not suited for traversing some types of terrain.

Some vehicle drive arrangements comprise all-wheel drive arrangements or limited slip differentials in order to navigate and/or traverse certain types of terrain address this problem but they are not suitable for all situations.

In this regard, it will be appreciated that some drive arrangements comprise chassis with centrally located wheels provided with the chassis to overcome obstacles, etc. However, these wheels compact over, for example, re-growing tree stumps, cane field lines, etc.

In addition, many work vehicles having work apparatuses for load carrying or displacing loads such as loaders have the work apparatuses disposed on a load bed thereof with operation of the apparatuses occurring transverse the longitudinal axis of the vehicles, at one side thereof. In this regard, if a work vehicle happens to reach a particular worksite, it will require an outrigger or stabiliser (for the opposite side) should the apparatus be required to lift or displace heavy loads as there is a risk that the centre of gravity of the work vehicle may shift during loading/lifting which may undesirably cause the work vehicle to topple over, in use.

Though prior art vehicles address some of the problems, for example, vehicles which have opposing pivotable axles such as the vehicle described in U.S. Pat. No. 6,659,215. However, the prior art vehicles do not address all the problems addressed by the invention disclosed herein.

It is therefore an object of the invention to provide a work vehicle to address the abovementioned problems and/or to provide a different work vehicle.

SUMMARY OF THE INVENTION

According to a first aspect of the invention there is provided a work vehicle comprising:
  a chassis frame extending along a longitudinal axis of the vehicle;
  a first axle connectable to at least one wheel, the first axle being pivotably mounted relative to the chassis frame substantially transverse to the longitudinal axis of the vehicle, wherein the first axle is configured to be pivotably displaceable about a first pivot axis perpendicular to the longitudinal axis of the vehicle;
  a second axle connectable to at least one wheel, the second axle being longitudinally spaced from the first axle and configured to be pivotably displaceable about a second pivot axis transverse to the longitudinal axis of the vehicle;
  a linkage means coupling the first axle to the second axle for pivoting the first and second axles in a relatively opposing fashion, such that, in use, pivoting of the first axle in one direction about the first pivot axis causes pivoting of the second axle in an opposite direction about the second pivot axis (about the chassis frame);
  a steering control means operable by an operator, wherein the steering control means is operable to control pivoting of the first axle about the first pivot axis and, via the linkage means, pivoting of the second axle oppositely about the second pivot axis;
  a support frame mounted fixedly relative to the first axle; and
  a work apparatus mountable to the support frame and displaceable relative to the vehicle wherein, in use, the steering control means causes the support frame and work apparatus to rotate with the first axle about the first pivot axis under control of an operator.

It will be appreciated that pivotable displacement of the first axle in a first direction about the first pivot axis may cause reciprocal pivotable displacement of the second axle in an opposite second direction about the second pivot axis, and vice versa. The first direction may be a clockwise direction about the pivot axes, and the second direction may be an anti-clockwise direction about the respective pivot axis. In other words, the first and second axles may be counter rotatable about first and second pivot axes by way of the linkage means.

The linkage means may comprise:
  a first actuator member mounted to the first axle and the chassis frame, the first actuator member being rotatable about the first pivot axis;
  a second actuator member mounted to the second axle and the chassis frame, the second actuator member being rotatable about the second pivot axis; and
  a connecting means connected to both the first actuator member and the second actuator member to cause the first and second actuator members, and hence the first and second axles, to rotate in an opposing fashion, in use.

The connecting means may comprise an elongate member selected from one of a chain, rope or wire which diagonally connects a left portion of the first actuator member to the right portion of the second actuator member, and a right portion of the first actuator member to the left portion of the second actuator member.

The first and second actuator members may be in the form of plate-like circular turntables having circumferentially extending swaged grooves in which the elongate member is restrainably located by way of suitable locating formations. The elongate member may be configured in a figure eight around the turntables coupling the same.

The vehicle may comprise a platform body having an operative support surface for supporting a cabin housing seating and controls for an operator, wherein the platform body is mountable on the chassis frame and is connectable to the first actuator member such that the platform body and the first actuator member sandwich the chassis frame and such that the platform body is rotatable about the first pivot axis, in use.

The platform body may be circular plate-like and of similar diameter as the first actuating member.

The support frame may rest at least partly on the platform body.

The support frame may comprise a pair of parallel spaced apart side frame walls connected to the first axle, a top frame extending transversely between the side frame walls at top ends thereof and a rear frame wall extending transversely between lateral ends of the side frame walls, wherein the work apparatus is connectable to a trunnion provided at the top frame.

The work apparatus may comprise at least one elongate articulated arm having a proximal end rotatably attachable to the support frame about an axis parallel to a longitudinal axis of the first axle, in use, such that the arm is disposed in front of an operator.

The work apparatus may be hydraulically actuable and may comprise a load displacing or a load carrying means.

The steering control means may be coupled to a hydraulic actuator attached to the platform body, adjacent a circumference thereof, such that actuation of the hydraulic actuator causes the platform body and hence the first actuating member to rotate.

The first and second axles may be non-steering axles.

The first and second axles may be differential axles, and wherein each axle comprises connection means at opposite end portions thereof for connection to wheels.

The vehicle may comprise a power source for running the vehicle.

The vehicle may comprise a hydraulic drive means coupled directly to a transmission of differentials of the first and second axles thereby to drive all wheels of the vehicle.

The second axle may be rotatably mounted relative to the chassis to be rotatably displaceable about the longitudinal axis of the vehicle.

The chassis frame may comprise a longitudinally projecting shaft to which the second second axle, via a second actuating member, is rotatably mounted.

According to a second aspect of the invention there is provided a work vehicle to use on rugged and uneven terrain, the vehicle comprising:

a chassis frame extending along a longitudinal axis of the vehicle;

a first differential axle connectable to at least one wheel, the first axle being pivotably mounted relative to the chassis frame substantially transverse to the longitudinal axis of the vehicle, wherein the first axle is configured to be pivotably displaceable about a first pivot axis perpendicular to the longitudinal axis of the vehicle;

a second differential axle connectable to at least one wheel, the second axle being longitudinally spaced from the first axle and configured to be pivotably displaceable about a second pivot axis transverse to the longitudinal axis of the vehicle;

a first actuator member mounted to the first axle and the chassis frame, the first actuator member being rotatable about the first pivot axis;

a second actuator member mounted to the second axle and the chassis frame, the second actuator member being rotatable about the second pivot axis;

a connecting means connected to both the first actuator member and the second actuator member to cause the first and second actuator members, and hence the first and second axles, to rotate in an opposing fashion, in use, such that pivoting of the first axle in one direction about the first pivot axis causes pivoting of the second axle in an opposite direction about the second pivot axis;

a steering control means operable by an operator, wherein the steering control means is operable to control pivoting of the first axle about the first pivot axis and, via the linkage means, pivoting of the second axle oppositely about the second pivot axis;

a platform body having an operative support surface for supporting a cabin housing seating and controls for an operator, wherein the platform body is mountable on the chassis frame and is connectable to the first actuator member such that the platform body and the first actuator member sandwich the chassis frame and such that the platform body is rotatable about the first pivot axis, in use, wherein the steering control means causes the platform body to rotate with the first axle about the first pivot axis under control of an operator.

The vehicle may comprise a support frame and a work apparatus operatively attachable to the same, the support frame being attachable to or at least partly to the platform body and/or the first axle. The vehicle may comprise a power source for running the vehicle.

The apparatus may comprise a plurality of first second axles. The first and second axles may be respectively grouped or may be provided in an alternating fashion, for example, a plurality of spaced first axles may be grouped and a plurality of second axles may be grouped; or a plurality of pairs of first and second axles may be provided in an alternate fashion.

The chassis frame may comprise an elongate chassis frame having a relatively narrow width to allow the first and second axles to pivot to a large degree relative thereto.

The first and second pivot axes may be provided adjacent respective attachment interfaces between respective first and second axles and the chassis.

The connecting member may comprise a flexible cable or chain loop disposed in a figure eight fashion between the first and second actuator members such that the first and second actuator members engage with the connecting member at respective end loop portions thereof.

In some example embodiments, the linkage means may comprise a mechanical link, for example, a gear arrangement disposed between the first and second axles to cause reciprocal displacement of the second axle as herein described.

The vehicle may comprise the wheels.

BRIEF DESCRIPTION OF THE DRAWINGS

FIG. 12 shows a schematic rear view of the vehicle of FIG. 7, in use, in accordance with an example embodiment of the invention.

DESCRIPTION OF PREFERRED EMBODIMENTS

In the following description, for purposes of explanation, numerous specific details are set forth in order to provide a thorough understanding of an embodiment of the present disclosure. It will be evident, however, to one skilled in the art that the present disclosure may be practiced without these specific details.

Figure 1:
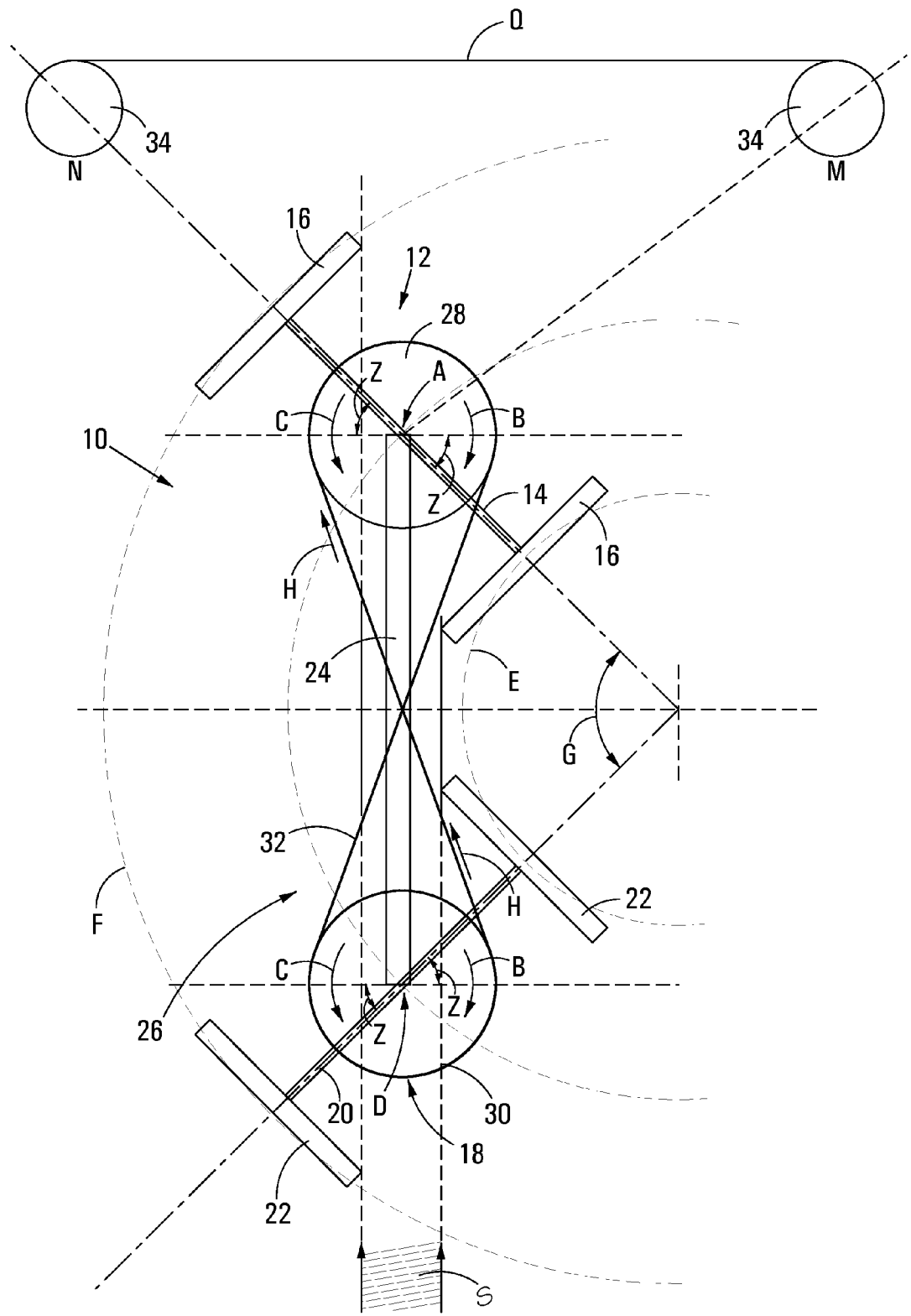
FIG. 1 shows a schematic plan view of certain elements of a vehicle, particularly parts of a steering or drive arrangement thereof, in accordance with an example embodiment of the invention.

Referring to FIG. 1 of the drawings, a vehicle, though illustrated basically, in accordance with an example embodiment of the invention is generally indicated by reference numeral 10. The vehicle 10 may be a vehicle which traverses rugged or uneven terrain. The vehicle 10 may be self-propelled, propelled by way of a suitable engine or power unit or drawn to enable the vehicle to traverse terrain. Although not limited thereto, the vehicle 10 may typically find particular application in agricultural implementations, for example, agricultural vehicles so that the same may traverse uneven and rugged terrain associated with plantations (crops, forestry, or the like).

The vehicle 10 has drive arrangement which essentially comprises a first drive means 12 having an elongate first axle 14 connectable to wheels 16 at longitudinally spaced end portions thereof via suitable conventional connection means such as conventional wheel hubs. The apparatus 10 also comprises a second similar second drive means 18 also comprising an elongate second axle 20 connectable to wheels 22 adjacent longitudinally spaced end portions thereof. It will be noted that the wheels 16, 22 may be a conventional rubber clad wheels used with vehicles.

The first axle 14 and second axle 20 may be substantially similar and may be similar to conventional arrangements provided with conventional vehicles. The axles 14, 20 may comprise elongate bars having a length of approximately 1.9 meters. The axles 14, 20 may be differential axles. In addition, the axles 14, 20 may be non-steering axles with built-in transmissions.

The first and second axles 14, 20 may be front and rear axles of the vehicle 10.

The first axle 14 and second axle 20 may both be connectable to an elongate chassis frame 24, particularly to end portions thereof, in a pivotable fashion. The first axle 14 is pivotably displaceable relative the chassis 24 about a first pivot axis or pivot point A, adjacent the zone of attachment of the first axle 14 and the chassis 24, in a first clockwise direction B and a second anti-clockwise direction C. Similarly, the second axle 20 is pivotable relative the chassis 24 about a second pivot axis or pivot point D in a first clockwise direction B and a second anti-clockwise direction C (in top view). It will be appreciated that the axles 14 and 20 are substantially parallel and transverse to the chassis 24 when the vehicle 10 is travelling on a straight path. However, the axles 14 and 20 may be pivotable between an angle z of 0 and 45 degrees relative to the chassis 24 (in directions B and C as the case may be). The first and second pivot axes A, D may be substantially perpendicular to the longitudinal axis of the vehicle 10.

The chassis 24 may be shaped and dimensioned to allow the first and second axles 14, 20 to pivot to a large degree relative thereto thereby allowing the vehicle 10 to have a substantially large turning radius (inside E, for example 1 meter, and outside F), in use, when the vehicle 10 is being driven or drawn. In particular, the chassis 24 may comprise an elongate bar of approximately 3 meters and may advantageously provide an un-compacted area S of approximately 0.4754 meters.

The first axle 14 and the second axle 20 are advantageously connected to each other via a linkage means 26. The linkage means 26 couples the first axle 14 to the second axle 20 to pivot in an opposing fashion such that pivoting of the first axle 14 in one direction about the first pivot axis A, either direction B or C, causes corresponding pivoting of the second axle 20 in an opposite direction, either direction C or B respectively as the case may be, about the second pivot axis D.

When in full lock in one direction, the axles 14, 20 of the first and second arrangements 12, 18 are separated by an angle G of approximately between 70 and 100 degrees, preferably approximately 89 degrees. The turning angle of 89 degrees is a maximum as the vehicle 10 may have the axles 14, 20 moving underneath the centre line or axis of the chassis 24 and may become very unstable especially in uneven terrain.

In the illustrated example embodiment, the linkage means 26 comprises a first plate-like circular rotatable turntable actuator member 28 fixedly attachable to the first axle 14, a similar rotatable second circular turntable actuator member 30 fixedly attachable to the second axle 20, and a connecting member 32 attachable to both the actuator members 28, 30 to cause the opposing movement of the first and second arrangements 12, 18 as mentioned above, substantially in a synchronised or reciprocal fashion. The members 28, 30 are typically rotatable about the first and second axes A, D and are thus configured to cause pivoting of the first and second actuator members 12, 18 about the first and second axes A, D in response to rotation thereof.

In this regard, the connecting member 32 may comprise a steel cable, rope or chain loop all with optional linkage members disposed in a figure eight fashion between the first and second actuator members 28, 30 such that the first and second actuator members 28, 30 engage with the connecting member 32 at respective end loop portions thereof. Essentially, the member 32 connects a left side of the first member 28 to the right side of the second member 30, and also the right side of the first member 32 to the left side of the second member 30 to bring about the desired opposing rotation. It will be noted that the connecting member 32 need not form a figure eight but may simply be affixed to the side portions of the turntables 28, 30 to the same end.

In one example embodiment, the members 28, 30 may comprise teeth to engage with the chain or cable 32 (not illustrated) such that displacement of the member 32 causes displacement of the members 28, 30. The members 28, 30 may each comprise circumferentially extending flanges which define a channel or groove therebetween to receive the member 32 securely and snugly therein. In the latter, preferred example embodiment, the grooves may be swaged and the members 28, 30 may define retaining or locating members to locate the member 32, preferably in the form of a steel cable, therein.

In the manner described above, the steel cable 32 may be securable around the members 28, 30 and may be of a desired length and tolerance to cause corresponding opposing displacement of the second axle 20 in response to displacement of the first axle 14. In this regard, it will be understood that displacement of the actuator member 28 in the direction of the arrow B (the axle 14 is turned clockwise) causes the chain 32 to be drawn in at least direction H which in turn causes the actuator member 30 to rotate in direction C which causes the second axle 20 to pivot about axis D to rotate in direction C opposite to the direction B in which the first axle 14 is pivoted.

Although not discussed or illustrated, in some example embodiments, the linkage means 26 may comprise a mechanical link, for example, a gear arrangement disposed between the first and second axles 14, 20 to cause opposing displacement of the second axle 20 in a desired fashion.

In one example embodiment, as will be described below, a cab housing seating and control for an operator may be located on or adjacent the first arrangement 12 or axle 14, particularly atop the member 28, such that an operating zone 34 provided, for example, by way of a boom may be directly in line of sight for an operator and may be displaceable between points M and N along a line Q in response to the first arrangement 12 being displaced between first and second positions.

It will be understood that in one example embodiment, only the first axle 14 may be controllable to turn or pivot about axis point A by an operator, for example, by a steering control means operating the turntable 28 which in turn causes the second axle 20 to turn oppositely as hereinbefore described. Instead, or in addition, the member 32 may be controlled by the steering control means associated with the vehicle 10 to control the arrangements 12, 18 in a fashion described herein.

The vehicle 10 may also advantageously allow or provide for an un-compacted area when the vehicle 10 moves forward and swivel's the axles 14, 20.

It will be noted that the axles 18, 20 are mounted to the chassis frame 24 via the members 28, 30. To this end, the members 28, 30 may be longitudinally spaced and mounted adjacent end portions of the chassis 24.

Figure 2:
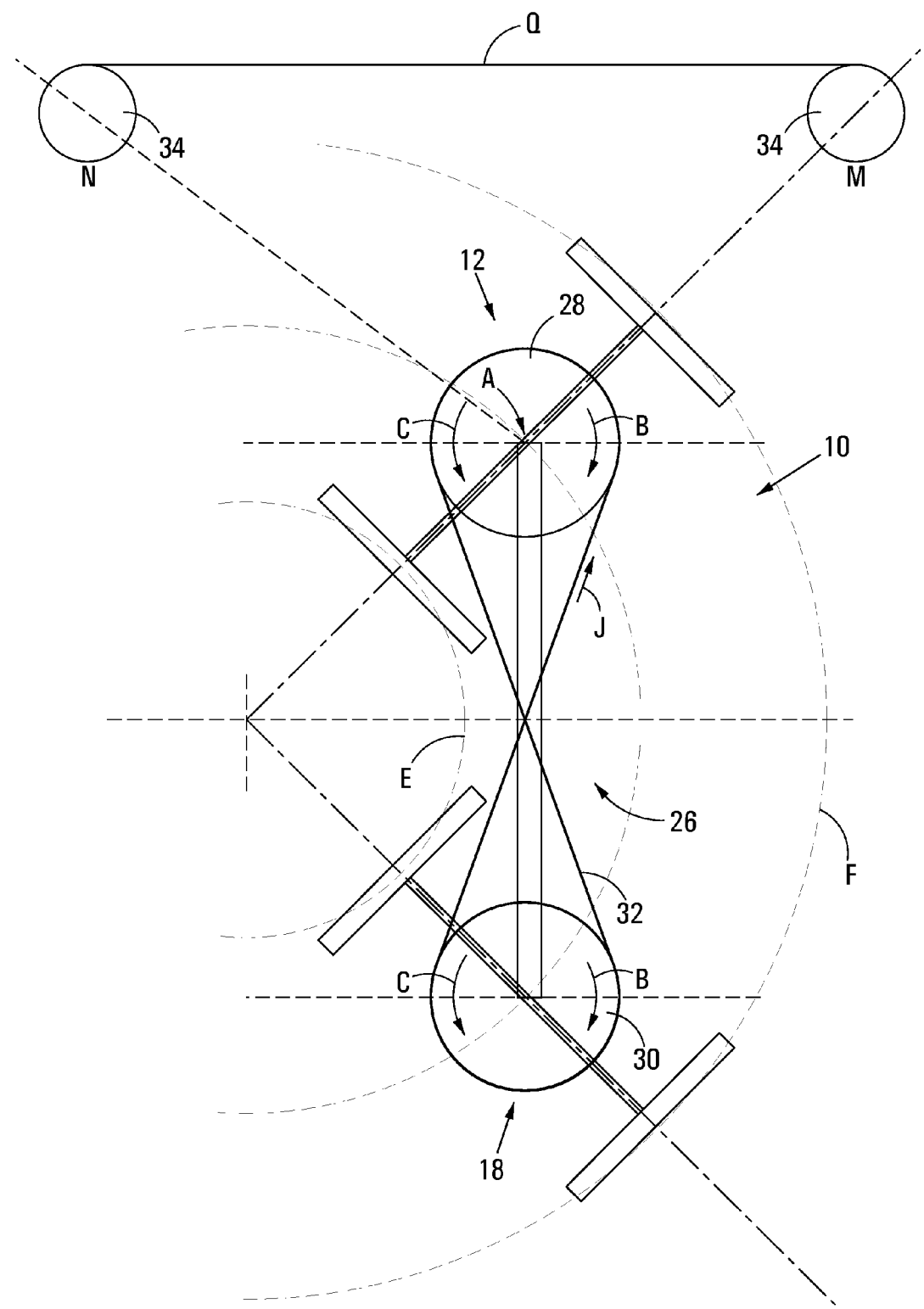
FIG. 2 shows another schematic plan view of certain elements of a vehicle, particularly parts of a steering or drive arrangement thereof, in accordance with an example embodiment of the invention.

In FIG. 2, the vehicle 10 as described above is illustrated with the first and second arrangements 14, 20 provided in different turning positions.

In particular, the first axle 14 is pivoted in full lock in direction C which causes the member 28 to correspondingly rotate to draw the cable 32 in direction J which rotates the member 30 to pivot in an opposing fashion in direction B about axis D.

Rotation of the first axle 14 in this fashion causes the zone 34 illustrated in FIG. 1 to move in direction Q to the position illustrated in FIG. 2. It will be understood that the cable 32 (or gears in other example embodiments) may be set to a specific timing between the axles 14, 20 and pivot axes. An actuator, particularly a hydraulic actuator such as a hydraulic cylinder, for example, a gas, or fluid cylinder (not illustrated) may be provided adjacent the cable 32 and/or the chassis 24 to hydraulically assist steering of the vehicle 10 in a similar fashion to a power steering mechanism. To this end, the cylinder may be controllable the by the steering control means of the vehicle 10, for example, in a conventional manner.

To this end, it will be noted that the steering control means may be similar to conventional steering control means, for example, which transfers steering movement from a joystick or steering wheel operated by an operator to direct operation of the hydraulic cylinder. Instead, it will be noted that the steering control means may be remotely operable by way of suitable processors and wireless transmitters and receivers provided in a remote control unit and the vehicle 10.

Figure 3:
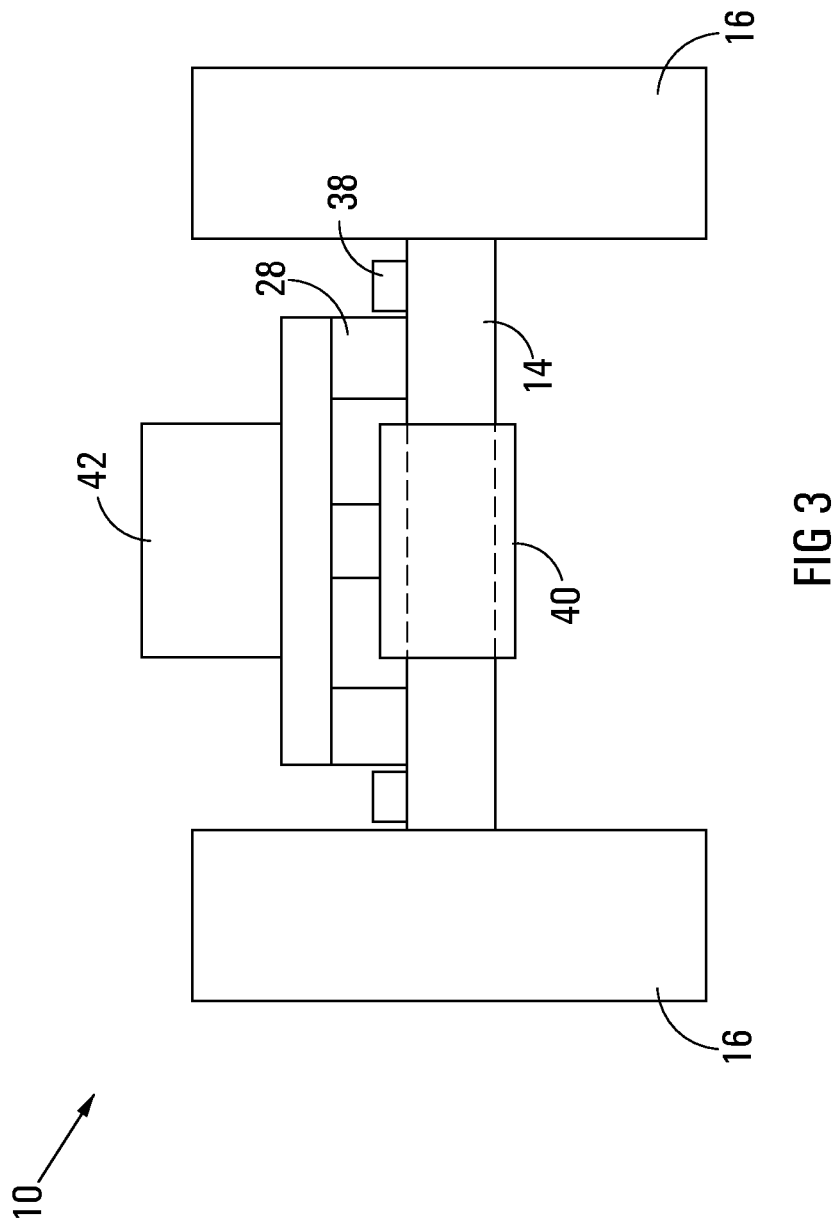
FIG. 3 shows a schematic side view of a vehicle in accordance with an example embodiment of the invention.

In FIG. 3, a side view of a vehicle 10 similar to the vehicle 10 described above is illustrated. The side view of the vehicle 10 illustrates the first drive arrangement 12 in more detail, in accordance with an example embodiment. As the second drive arrangement 18 is substantially similar to the first drive arrangement 18, comments made with reference to the first arrangement 12 apply substantially to the second arrangement 18.

The first drive arrangement 18 comprises a tie rod bracket 38 and a slip differential or differential lock means 40. It will be appreciated that the diff turning axis via pinion drive from the diff which is vertical is the same as the member 28 and hydraulic drive.

It will be noted that the vehicle 10 has no propshaft drive and is driven by way of a hydraulic drive unit connected directly to the transmission of the differential 40.

Figure 4:
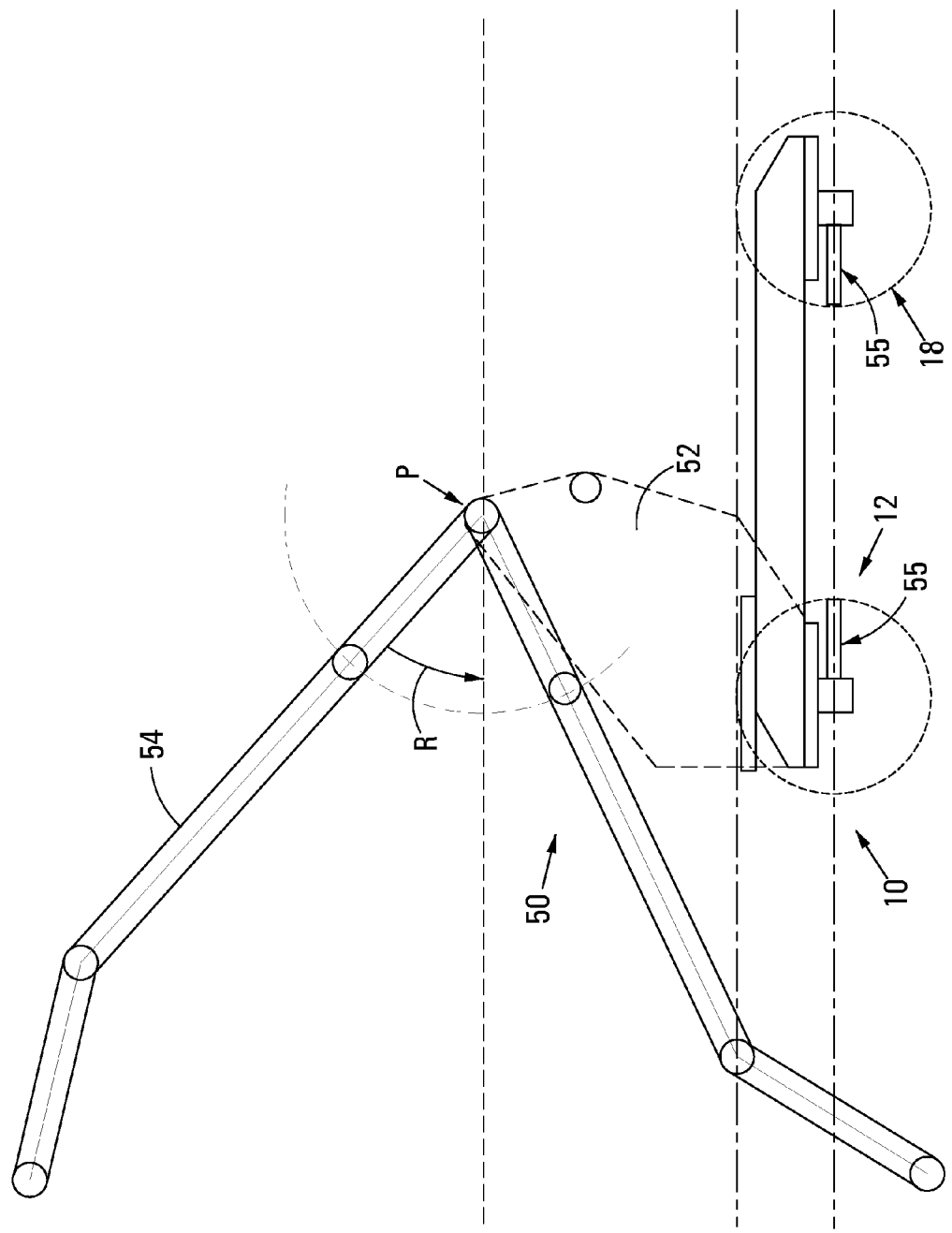
FIG. 4 shows a schematic side view of a portion of a vehicle in accordance with an example embodiment of the invention.

In FIG. 4, a vehicle 50 in accordance with an example embodiment of the invention is generally indicated by reference numeral 50. Where applicable or necessary, reference numerals to like parts used above may be used in the description which follows.

The vehicle 50 is typically powered by a power plant (not illustrated), for example, by an internal combustion, electric, hybrid engine, or the like. In a preferred example embodiment, the power plant may drive hydraulic pumps to pump hydraulic fluid in a hydraulic circuit to and from one or two hydraulic motors, in a conventional manner. At least one hydraulic motor being in operative connection with the first and/or second axles 14, 20, via transmissions of the associated differentials thereby to provide four wheeled drive to the vehicle 50.

As mentioned, the vehicle 50 comprises an all wheel drive arrangement. However, the first axle 14 only may be driven. Instead, or in addition, the vehicle 50 comprises a limited slip differential. In addition, the vehicle 50 may comprise a steering control means (not shown) to control the rotation or pivoting of the first axle 14 to cause turning of the vehicle, in use. The steering control means may comprise a rack and pinion type steering, hydraulic, steering, or the like to receive input from the operator as described above.

The vehicle 50 may comprise a cab 52 mountable adjacent, particularly on the first axle 14. The cab 52 may provide an enclosure within which seating for an operator may be locatable. In this way, an operator may be advantageously adjacent the front wheel arrangement 12 which is controllably rotatable such that operators can have direct line of sight when operating the vehicle and the second axle 20 substantially tracks the first axle 14.

Controls for the vehicle 50, for example, conventional controls such as a steering, accelerator, gears and braking controls may be provided in the cab for us in a conventional fashion.

A work apparatus such one comprising a controllable boom 54 may be attachable to the cab 52 or suitable support frame also located with the first axle 14 and may be pivotable about axis P in at least the direction R. In example embodiments, it will be appreciated that the boom 54 may be rotatable in three dimensions. The boom 54 may have a counterweight disposed to counter the weight of the load displaced or carried by the boom. This enables the apparatus 54 to lift large loads.

The boom 54 may be articulated and overhangs the cab such that the same is always within the line of sight of the operator. In addition, as the boom 54 is mounted to the front axle 14, more weight may be lifted thereby due to better control of the centre of gravity of the vehicle 10 by the steering of the first and second axles 14, 20 in a manner described herein.

The vehicle 50 may be used for crop-spraying, drop siviculture, or in use as a loader. Drawn implements advantageously draw implements which follow the contour of the track without cutting corners.

It will be appreciated that FIG. 3 shows a two wheel drive arrangement with a hydraulic motor via a reduction box (to reduce speed) together with a differential lock. However, in FIG. 4, the differentials are inverted with a power take off drive coming out at right angles. This advantageously allows for a substantially straight universal drive with no bends. This main drive shaft may stay in the same plane as the chassis 24 although the axles, 14, 20 may be rotating. It will be noted that this arrangement advantageously allows for a 4×4 or 4×2 arrangement.

It will be noted that the in some examples drive shafts may be provided and connected to the main power transmission unit.

The vehicle 10 may comprise a hydraulic drive with a reduction box 42.

Figure 5:
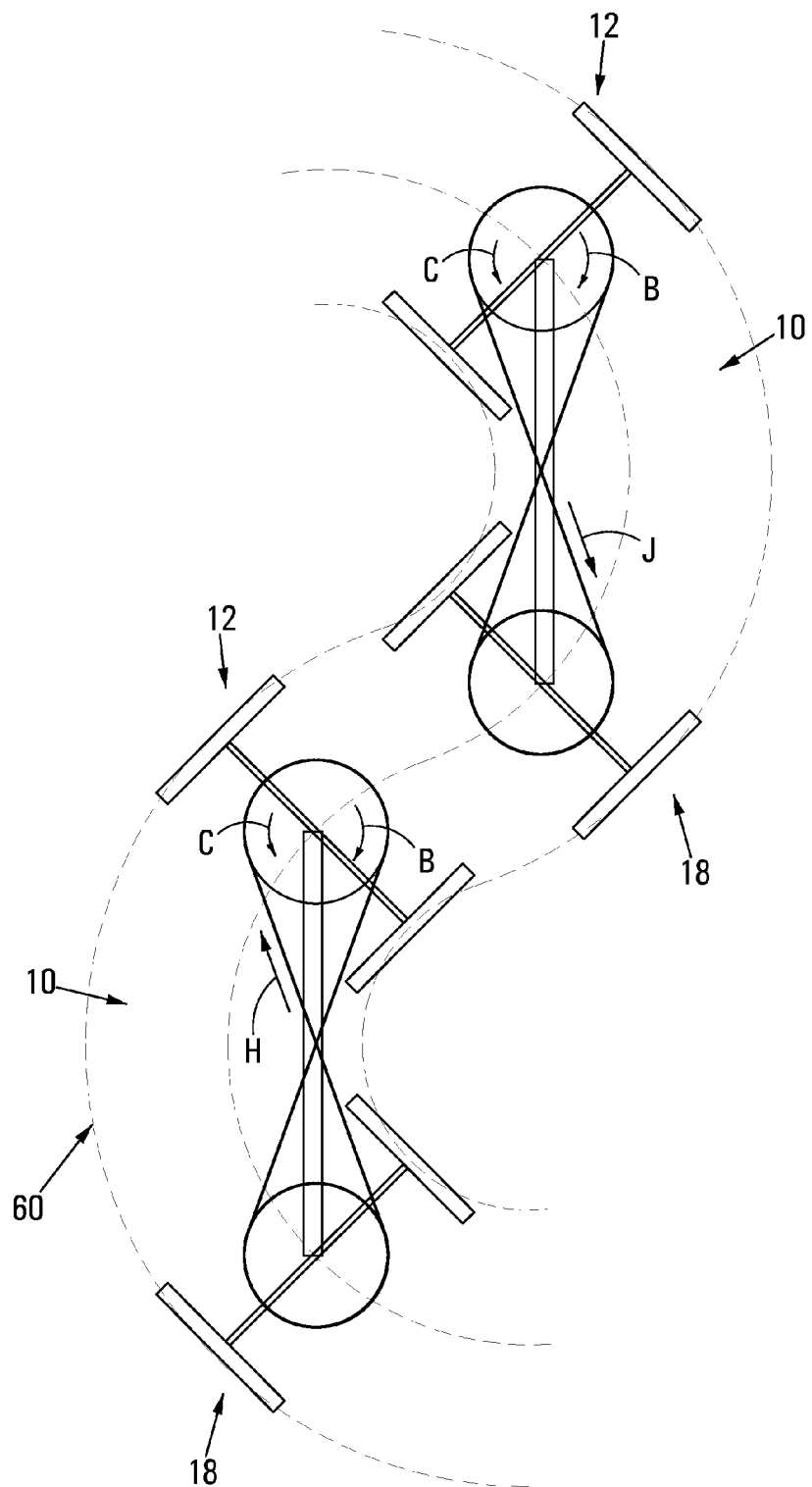
FIG. 5 shows a schematic, in use, plan view of certain elements of a vehicle, particularly parts of a steering or drive arrangement thereof, in accordance with an example embodiment of the invention.

In FIG. 5, the vehicle 50 is shown, in use, being driven along a path 60 in the direction of arrow W. The path 60 may typically be on a rugged terrain, for example, on agricultural land which is difficult to traverse by means of conventional vehicles.

When being driven in a conventional manner, the operator controls, particularly steers the vehicle 50, for example, to overcome obstacles or very difficult terrain by causing the first axle 14 to pivot anti-clockwise in the direction of arrow C about axis A. Turning of the first axle 14 causes the turntable member 28 to also correspondingly rotate which causes the chain or cable 32 to be drawn around the member 28 and move in direction H. Movement of the cable 32 causes the member 30 to be rotated in clockwise direction B which correspondingly causes the second arrangement 18 to turn in a corresponding and direct but opposite or opposing fashion in the direction B. This may be repeated for a portion of the steep incline, i.e., the operator may operate the steering means to alternately displace the first axle 14 in first and second directions between respective first and second locked positions, wherein the first locked position is the first arrangement 12 locked in the first clockwise direction B and the second locked position is the first arrangement 12 locked in the second anti-clockwise direction C. It follows that the second arrangement 18 is correspondingly displaced, in an opposing fashion, also between respective second and first locked positions in response to the displacement of the first arrangement 12 as herein described.

It will be noted that the continual opposing pivoting movements of the first and second axles 14, 20 in clockwise and anti-clockwise directions B and C advantageously causes a lizard-like S-shaped movement of the vehicle 50 along the path 60 which advantageously aids in negotiating the difficult terrain. Operation of the vehicle 50 in this fashion conveniently reduces the risk of vehicle becoming ensnared and stuck in the terrain.

Figure 6:
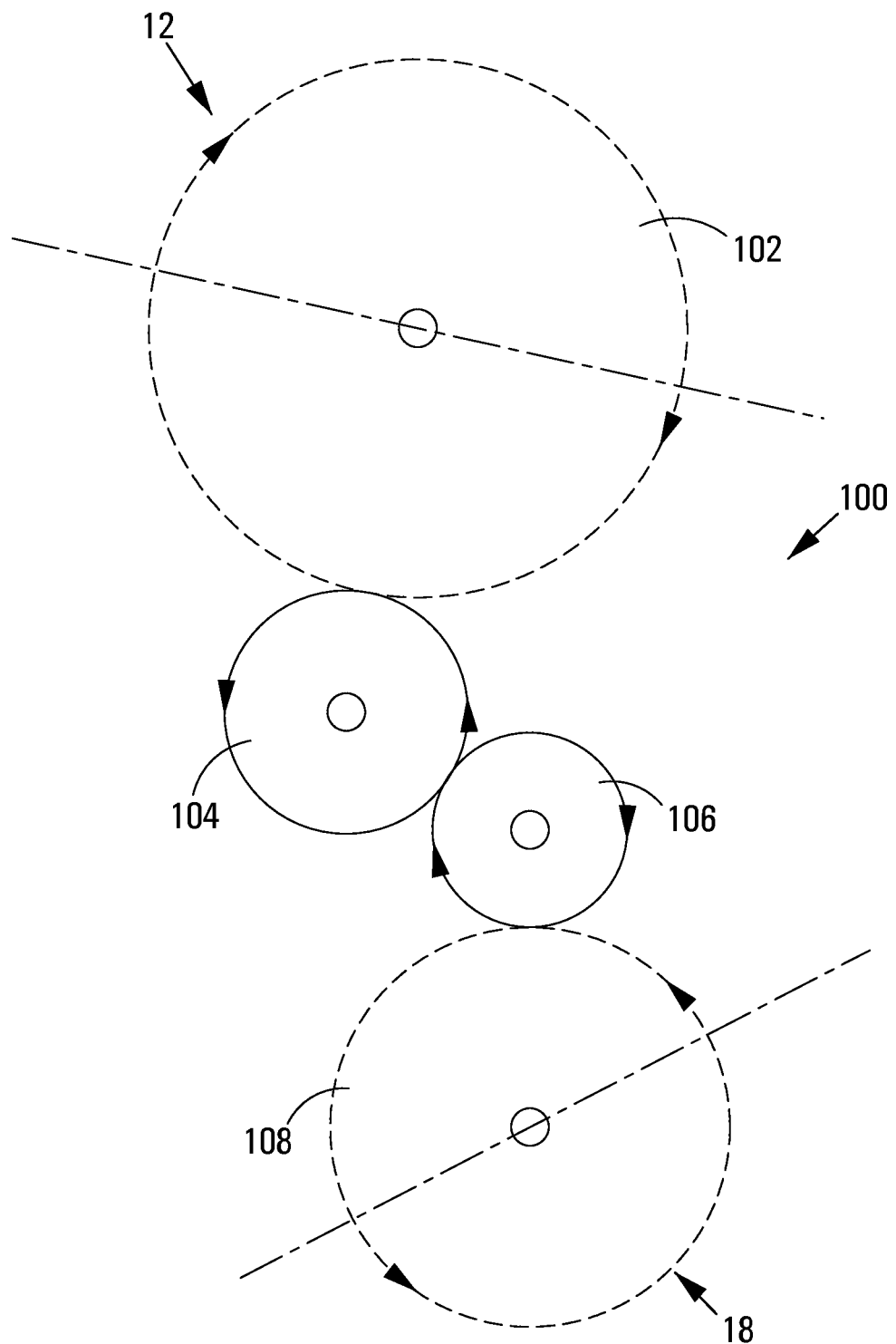
FIG. 6 shows another schematic plan view of certain elements of a vehicle, particularly parts of a steering or drive arrangement thereof, in accordance with an example embodiment of the invention.

In FIG. 6, another schematic representation of a portion of a vehicle 100 is illustrated. The vehicle 100 is illustrated to conceptually comprise counter rotatable gear wheels 104 and 106 which cause the arrangement 12 and 18 to be opposingly displaceable around areas 102 and 108 in a manner as hereinbefore described. The wheels 104 and 106 may comprise complementary teeth which engage with each other to provide the functionality desired by the present invention.

In FIGS. 7 to 12, another example embodiment of a vehicle in accordance with an example embodiment of the invention is illustrated and generally indicated by reference numeral 200. Though illustrated in more detail, it will be understood that the vehicle 200 is substantially similar to the example embodiments described above with reference to FIGS. 1 to 5, in particular, and therefore like parts will be identified by the same reference numerals as previously provided. In addition, it will be understood that descriptions of various components described above will extend substantially to the discussion of FIGS. 7 to 12.

Figure 7:
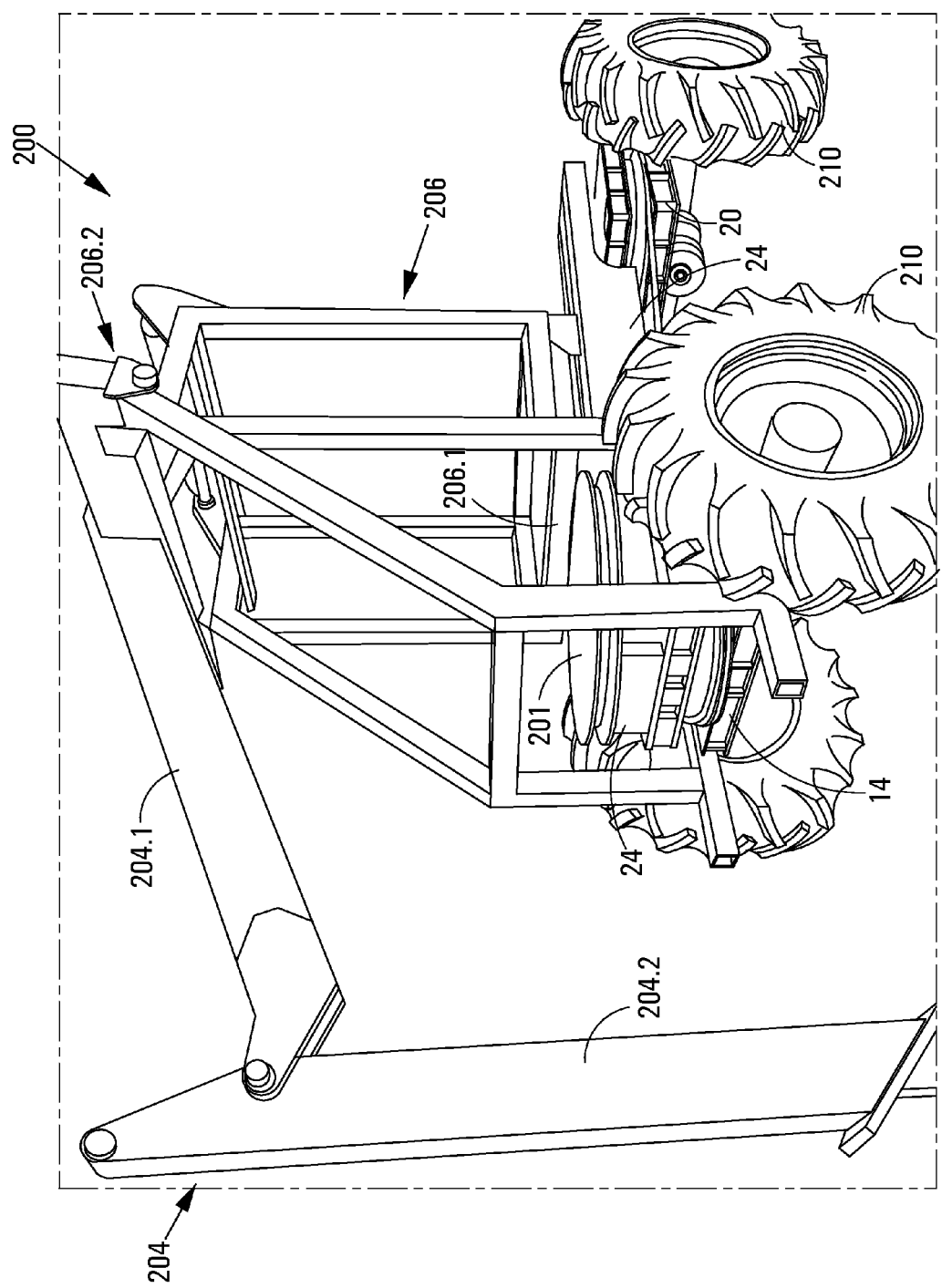
FIG. 7 shows a perspective view of another example embodiment of a vehicle in accordance with an example embodiment of the invention.
Figure 8:
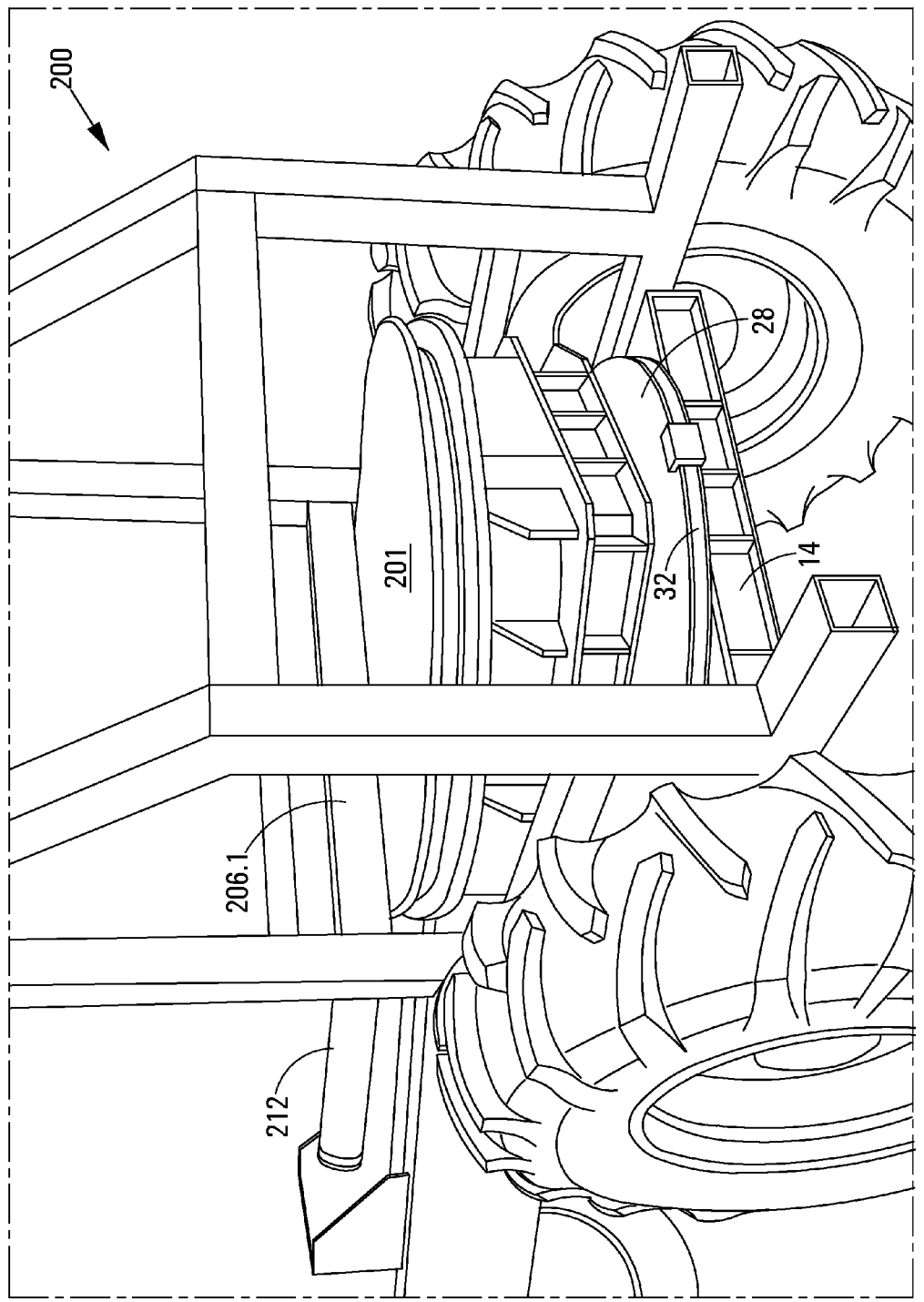
FIG. 8 shows a perspective view of a front portion of the vehicle of FIG. 7, in more detail.

In any event, as can be seen more clearly in FIGS. 7 and 8, the vehicle 200 comprises a platform body 201 mounted to the chassis frame 24. The platform body 201 is substantially plate-like and circular and is connected axially to the first actuator member 28 (e.g., via a welded joint between a suitable connector through the chassis frame 24 welded axially to the member 28 and the body 201) such that the platform body 201 and the member 28 sandwich the chassis frame 24 and are rotatably displaceable as a single unit about the first axis A relative to the chassis 24. It will be noted that the platform body 201 is also a turntable and defines an operative support surface which is provided in a prominent fashion on the chassis frame 24. In this way, the platform body 201 rests on the chassis and provides a base for the attachment or at least part-attachment of a cabin (not illustrated) which houses the steering control means, seating, and other controls such as drive controls for an operator. This helps to distribute the weight of the cabin, etc. as well as the load lifted by means of a work apparatus 204. In other words, the platform body 201 and the member 28 together act as a large bearing to take shifting axial loads as will be mentioned below.

The vehicle 200 also comprises a support frame 206 which is mountable to the first axle 14 and partly on the platform body 201 at least to distribute weight to the chassis frame 24, via the platform body 201, and the first axle 14. Various configurations may be realisable with attaching the frame 206 to the first axles 14 as it may be done via welding directly or the support frame 206 may entirely be mounted on the platform body 201. However, what is important is that the support frame is rotatable or pivotable together with the first axle 14 as a singular unit for reasons described below.

The frame 206, illustrated scantly, has spaced apart parallel side frame walls mounted on the first axle 14, a front strut extending transversely between front end portions of the side frame walls, a pair of parallel rear cross struts extending transversely between rear end portions of the side frame walls, a intermediate cross strut 206.1 extending transversely between the side frame walls at an intermediate location between the side frame walls, wherein the cross-strut 206.1 is located to rest on the platform body 201 thereby further enhancing the load bearing capability of the vehicle 200. The frame 206 also has a top frame portion 206.2 attachable to the top of the frame 206, the top frame portion 206.2 providing means for attachment of the work apparatus 204, for example, a trunnion.

The cabin and parts which the same conventionally houses may be arranged in and/or around the frame 206. It will be noted that a viewing portal of the cabin may overlook the work or operation area of the vehicle 200, i.e., the operational space or area of the apparatus 204.

The work apparatus 204 comprises at least one load displacing articulated arm having a proximal portion 204.1 and a distal portion 204.2 rotatably attached thereto. The proximal portion 204.1 is connectable to the top frame portion 206.2 and the apparatus 204 is rotatably displaceable relative to the top frame portion 206.2 about an axis substantially parallel to the longitudinal axis of the first axle 14 and substantially transverse to the longitudinal axis of the vehicle 200. In this way, the apparatus 204 is overhead the operator located in the cabin, in use, and at least the distal portion 204.2 is always in front of the same if the viewing portal of the cabin overlooks an area adjacent the front of the vehicle. In one example embodiment, the viewing portal of the cabin may be typically be at the front portion of the frame 206 framed by the top frame portion 206.2, the front ends of the side frame walls and the front strut. It follows that with the configuration herein described, lifting of loads from a surface via the apparatus 204 is typically always substantially transverse, particularly perpendicular, to the longitudinal axis of the first axle 14 which increases stability in lifting heavy without the need for outrigger stabilisers or wide track width which are used to prevent conventional work vehicles such as loaders from toppling over in lifting heavy loads. This feature of having the means 204 effectively mounted onto the first chassis also addresses the problem of conventional vehicles having load displacing means located on the main chassis. Furthermore opposite displacement of the first and second axles 14, 20, in use, while lifting a load via the apparatus 204 mounted on the first axle 14 may shift the centre of gravity of the vehicle 200 which provides for greater stability and mitigated the risk of the vehicle 200 toppling over in lifting heavy loads by way of the apparatus 204.

Figure 9:
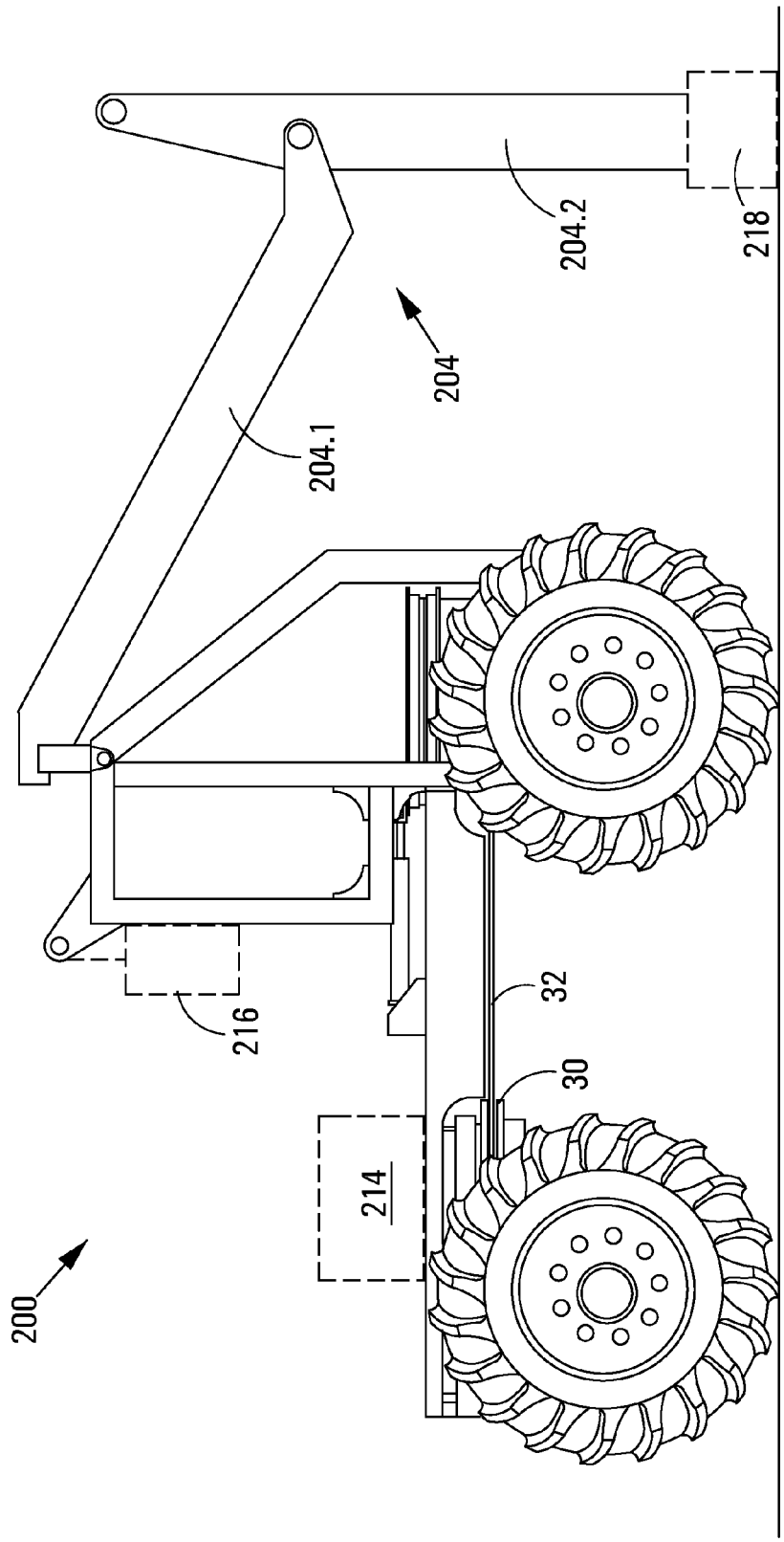
FIG. 9 shows a schematic side view of the vehicle of FIG. 7 in accordance with an example embodiment of the invention.

It will be understood that the steering control means which receives operator input as described above via a suitable joystick and/or steering wheel arrangement may operate a hydraulic actuator 212 as labelled in FIG. 8 but as can also be seen in FIG. 9. The hydraulic actuator 212 is in the form of a hydraulic cylinder mounted on the chassis 24 and having an effector arm, displaceable piston fashion hydraulically, attachable to the platform body 201, particularly adjacent a side thereof, or eccentrically, such that reciprocal displacement of the effector arm linearly causes corresponding angular or rotational displacement of the platform body 201 about the first axis A. It follows that rotation of the platform body 201 in turn causes the first actuator member 28 to rotate which in turn causes the first axle 14 to correspondingly rotate as well as cause the second axle 20 to rotate in an opposing or opposite fashion as hereinbefore described.

Turning to FIG. 9 in particular, it will be noted that the vehicle 200 may comprise a power source of engine 214 configured to drive the wheels 210, for example, in a manner described above or drive suitable hydraulic pumps (also located on the chassis) to transfer hydraulic fluid in a hydraulic circuit to two hydraulic motors, each coupled directly to a transmission of a differential of each drive arrangement 12, 18 to operate the wheels of the vehicle in a four wheeled drive manner.

In FIG. 9, it will be understood that the vehicle 200 may be provided with a counterweight 216 (illustrated schematically) located substantially to the rear of the support frame 206 and/or the apparatus 204 to counterbalance heavy loads lifted by way of the apparatus 204. The counterweight 216 may be removably attachable to the vehicle depending on the weight of the loads to be lifted.

In addition, it will be understood that the distal end of the distal portion 204.2 of the apparatus 204 may be provided with a pair of jaws, a grabber, a scoop, or other suitable load carrying and/or engaging apparatus 218 to enable the apparatus 204 to engage and/or lift and/or displace target loads.

The apparatus 204 is illustrated only roughly and not in detail and therefore it will be appreciated that the apparatus 204 is hydraulically operated via controls, for example, disposed in the cabin which are not illustrated. In a prototype example embodiment, seating for the operator was provided on the platform body 201 and controls may be arranged conventionally around the same. The apparatus 204 may be operated by way of the hydraulic circuit as described above of via a separate conventional hydraulic actuation mechanism, for example, similar to those used in loaders, etc.

Figure 10:
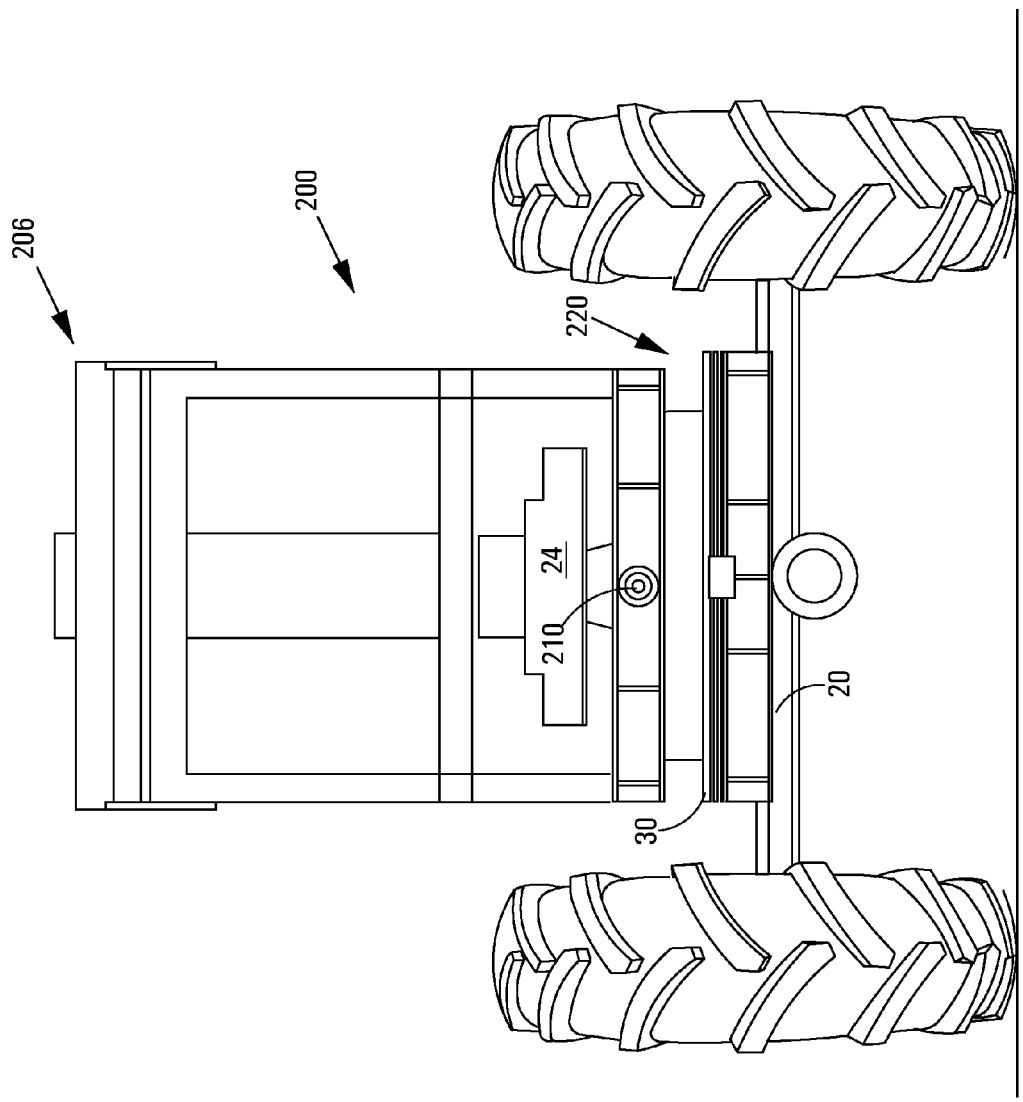
FIG. 10 shows a schematic rear view of the vehicle of FIG. 7 in accordance with an example embodiment of the invention.
Figure 11:
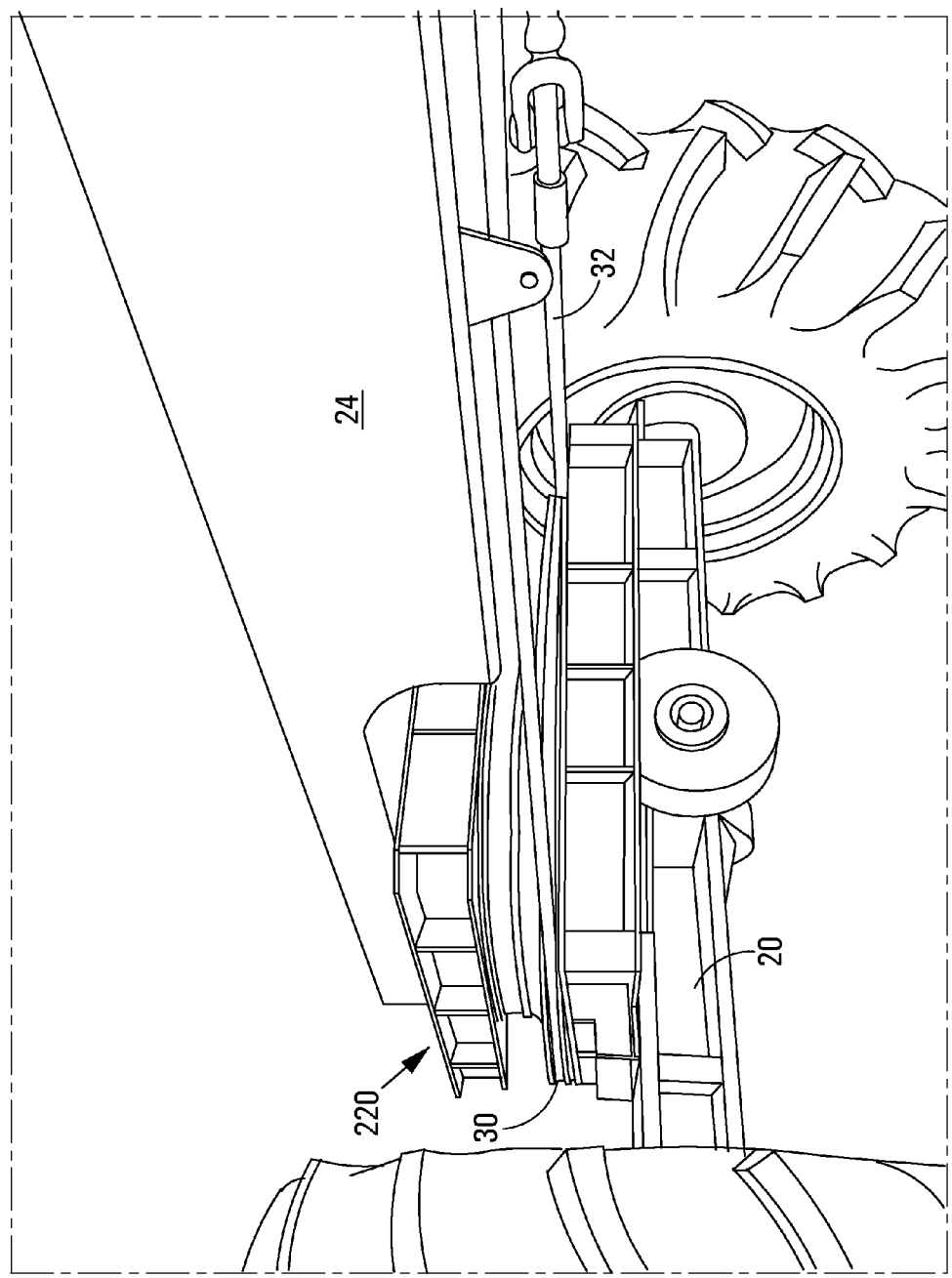
FIG. 11 shows a schematic view of a portion of the vehicle of FIG. 7, showing the rear or second drive arrangement of the vehicle in accordance with an example embodiment of the invention.

Referring particularly to FIGS. 10 to 12 of the drawings, it will be noted that the turnable 30 may be rotatably mounted to the chassis frame 24 such that the second axle 20 is pivotably displaceable relative to the chassis 24 about the longitudinal axis of the vehicle 200. The chassis frame 24 may comprise a longitudinally projecting shaft 210 (FIGS. 10 and 12) to which the second axle 20, via a second actuating member 30 and suitable attachment means 320, is rotatably mounted.

In this way the second axle 20 may oscillate, in use, about the shaft 210 as can be seen in FIG. 12 which illustrates the second axle 20 rotatably displaced about the chassis 24, particularly, shaft 210.

In use, the vehicle 200 is used in a similar fashion as hereinbefore described with reference to previous FIGS.

It will be noted that in some example embodiments, it will be understood that the support frame 206 may integrally form part the cabin. However, as aforementioned, this and other variations must not detract from the invention described herein.

The invention, particularly the s-shaped movement of the vehicle and hence the vehicle described herein, conveniently enables vehicles to be moved on steep terrain with a large degree of traction. Turning of the first axle 14 between full lock positions advantageously covers an area of approximately between 3.5-5 meters. The vehicle 10, 50, 100, 200 may be engageable in all wheel/4×4 drive (may be selectively operated) while negotiating steep incline rock with at least the first arrangement 12 being steered between the first and second directions in full locked positions (first and second locked positions). The resultant S-shaped movement is advantageous over conventional 4×4 motion as the centre line of the vehicle 10, 50, 100, 200 moves forward in a ratchet-fashion. The vehicle 10, 50, 100, 200 allows the same to turn on approximately a one meter turning radius, without cutting corners. An advantage of the present invention described herein, embodied in a vehicle, is that any driver with a conventional agricultural background will be able to drive and operate the machine without specialised training required. Because of its improved traction and manoeuvrability, by virtue of the opposing reciprocal displacement arrangement described above, the vehicle 10, 50 may comprise removable attachments affixed to its head and a GPS (Global Positioning System) unit operatively connected thereto, for example, for siviculture for large plantations. It will be noted that the vehicles described herein may be a three meter vehicle which can turn on a 1 meter radius. The drive of the wheels of the vehicles described herein is controlled via a transmission thereby mitigating wheel spin undesirably digs up regrowth area, particularly in forests. Turning the steering side to side may create a lizard-like movement.

The invention as described herein may find application in military and agricultural equipment.

The invention claimed is:

1. A vehicle comprising:
   a chassis frame extending along a longitudinal axis of the vehicle;
   a first axle connectable to at least one wheel, the first axle being pivotably mounted relative to the chassis frame and substantially transverse to the longitudinal axis of the vehicle, wherein the first axle is configured to be pivotably displaceable about a first pivot axis perpendicular to the longitudinal axis of the vehicle;
   a second axle connectable to at least one wheel, the second axle being longitudinally spaced from the first axle and configured to be pivotably displaceable about a second pivot axis transverse to the longitudinal axis of the vehicle;
   a linkage means coupling the first axle to the second axle for pivoting the first and second axles in a relatively opposing fashion;
   a steering control means operable by an operator, wherein the steering control means is operable to control pivoting of the first axle about the first pivot axis and, via the linkage means, pivoting of the second axle oppositely about the second pivot axis;
   a support frame mounted fixedly relative to the first axle; and
   a work apparatus mountable to the support frame and displaceable relative to the vehicle wherein, in use, the steering control means causes the support frame and work apparatus to rotate with the first axle about the first pivot axis under control of an operator, wherein the first and second axles are differential axles, and wherein each axle comprises a connection means at opposite end portions thereof for connection to wheels.

2. The vehicle as claimed in claim 1, wherein the linkage means comprises:
   a first actuator member mounted to the first axle and the chassis frame, the first actuator member being rotatable about the first pivot axis;
   a second actuator member mounted to the second axle and the chassis frame, the second actuator member being rotatable about the second pivot axis; and
   a connecting means connected to both the first actuator member and the second actuator member to cause the first and second actuator members, and hence the first and second axles, to rotate in an opposing fashion, in use.

3. The vehicle as claimed in claim 2, wherein the connecting means comprises an elongate member selected from one of a chain, rope or wire, which diagonally connects a left portion of the first actuator member to the right portion of the second actuator member, and a right portion of the first actuator member to the left portion of the second actuator member.

4. The vehicle as claimed in claim 3, wherein the first and second actuator members are in the form of circular plate-like turntables having circumferentially extending grooves in which the elongate member is restrainably located.

5. The vehicle as claimed in claim 4, wherein the vehicle comprises a platform body having an operative support surface for supporting a cabin housing seating and controls for an operator, wherein the platform body is mountable on the chassis frame and is connectable to the first actuator member such that the platform body and the first actuator member sandwich the chassis frame and such that the platform body is rotatable about the first pivot axis, in use.

6. The vehicle as claimed in claim 5, wherein the platform body is circular plate-like and of similar shape and/or diameter as the first actuating member.

7. The vehicle as claimed in claim 6, wherein the support frame rests at least partly on the platform body.

8. The vehicle as claimed in claim 5, wherein the steering control means is coupled to a hydraulic actuator attached to the platform body, adjacent a circumference thereof, such that actuation of the hydraulic actuator causes the platform body and hence the first actuating member to rotate.

9. The vehicle as claimed in claim 1, wherein the support frame comprises a pair of parallel spaced apart side frame walls connected to the first axle, a top frame extending transversely between the side frame walls at top ends thereof and a rear frame wall extending transversely between lateral ends of the side frame walls, wherein the work apparatus is connectable to a trunnion provided at the top frame.

10. The vehicle as claimed in claim 9, wherein the work apparatus comprises at least one elongate articulated arm having a proximal end rotatably attachable to the support frame about an axis parallel to a longitudinal axis of the first axle, in use, such that the arm is disposed in front of an operator.

11. The vehicle as claimed in claim 1, wherein the work apparatus is hydraulically actuable and comprises a load displacing or a load carrying means and a counterweight to counterbalance the weight of loads lifted by the work apparatus.

12. The vehicle as claimed in claim 1, wherein the first and second axles are non-steering axles.

13. The vehicle as claimed in claim 1, wherein the vehicle comprises a power source for running the vehicle.

14. The vehicle as claimed in claim 1, wherein the vehicle comprises a hydraulic drive means coupled directly to a transmission of differentials of the first and second axles thereby to drive all wheels of the vehicle.

15. The vehicle as claimed in claim 1, wherein the second axle is rotatably mounted relative to the chassis to be rotatably displaceable about the longitudinal axis of the vehicle.

16. A vehicle as claimed in claim 15, wherein the chassis frame comprises a longitudinally projecting shaft to which the second axle is rotatably mounted.

17. A vehicle comprising:

a chassis frame extending along a longitudinal axis of the vehicle;

a first differential axle connectable to at least one wheel, the first axle being pivotably mounted relative to the chassis frame substantially transverse to the longitudinal axis of the vehicle, wherein the first axle is configured to be pivotably displaceable about a first pivot axis perpendicular to the longitudinal axis of the vehicle;

a second differential axle connectable to at least one wheel, the second axle being longitudinally spaced from the first axle and configured to be pivotably displaceable about a second pivot axis transverse to the longitudinal axis of the vehicle;

a first actuator member mounted to the first axle and the chassis frame, the first actuator member being rotatable about the first pivot axis;

a second actuator member mounted to the second axle and the chassis frame, the second actuator member being rotatable about the second pivot axis;

a connecting means connected to both the first actuator member and the second actuator member to cause the first and second actuator members, and hence the first and second axles, to rotate in an opposing fashion, in use, such that pivoting of the first axle in one direction about the first pivot axis causes pivoting of the second axle in an opposite direction about the second pivot axis;

a steering control means operable by an operator, wherein the steering control means is operable to control pivoting of the first axle about the first pivot axis and, via the linkage means, pivoting of the second axle oppositely about the second pivot axis;

a platform body having an operative support surface for supporting a cabin housing seating and controls for an operator, wherein the platform body is mountable on the chassis frame and is connectable to the first actuator member such that the platform body and the first actuator member sandwich the chassis frame and such that the platform body is rotatable about the first pivot axis, in use, wherein the steering control means causes the platform body to rotate with the first axle about the first pivot axis under control of an operator.

18. A vehicle as claimed in claim 17, wherein the vehicle comprises a support frame and a work apparatus operatively attachable to the same, the support frame being attachable to or at least partly to the platform body and/or the first axle.

19. A vehicle as claimed in claim 17, wherein the vehicle comprises a power source for running the vehicle.

* * * * *